F. CONRAD.
SYSTEM FOR VAPOR ELECTRIC APPARATUS.
APPLICATION FILED JAN. 10, 1908.

931,114. Patented Aug. 17, 1909.

WITNESSES:
C. L. Belcher
Otto S. Schairer.

INVENTOR
Frank Conrad
BY
Hiley Sloan
ATTORNEY

UNITED STATES PATENT OFFICE.

FRANK CONRAD, OF SWISSVALE, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

SYSTEM FOR VAPOR ELECTRIC APPARATUS.

No. 931,114.     Specification of Letters Patent.     Patented Aug. 17, 1909.

Application filed January 10, 1908. Serial No. 410,242.

*To all whom it may concern:*

Be it known that I, FRANK CONRAD, a citizen of the United States, and a resident of Swissvale, in the county of Allegheny and State of Pennsylvania, have invented a new and useful Improvement in Systems for Vapor Electric Apparatus, of which the following is a specification.

My invention relates to gas or vapor electric apparatus, such as lamps and current-rectifying devices, and it has for its object to provide a transformer for use with such devices that shall be so constructed as to obviate the necessity or desirability of providing additional means for sustaining the current through the lamp or rectifying device and for regulating its operation.

In the operation of mercury-vapor lamps upon alternating current circuits, and in the operation of current-rectifying devices, it is usually necessary to provide means for maintaining and smoothing out the current through the said devices, and to also provide means for regulating the operation of the devices. The currents through such devices have usually been maintained and smoothed out by means of an inductive coil in the direct current circuits thereof, and the regulation has been effected, either by means of an ohmic resistance in the direct current circuit, or by means of inductive resistance in the alternating current circuit, whereby suitable drop in electromotive force is caused by the flow of current.

In the present instance, the use of devices separate from the transformer for sustaining and smoothing out the rectified current and for causing a sufficient drop of potential in the system is obviated, since both results are effected by the transformer.

Figure 1:
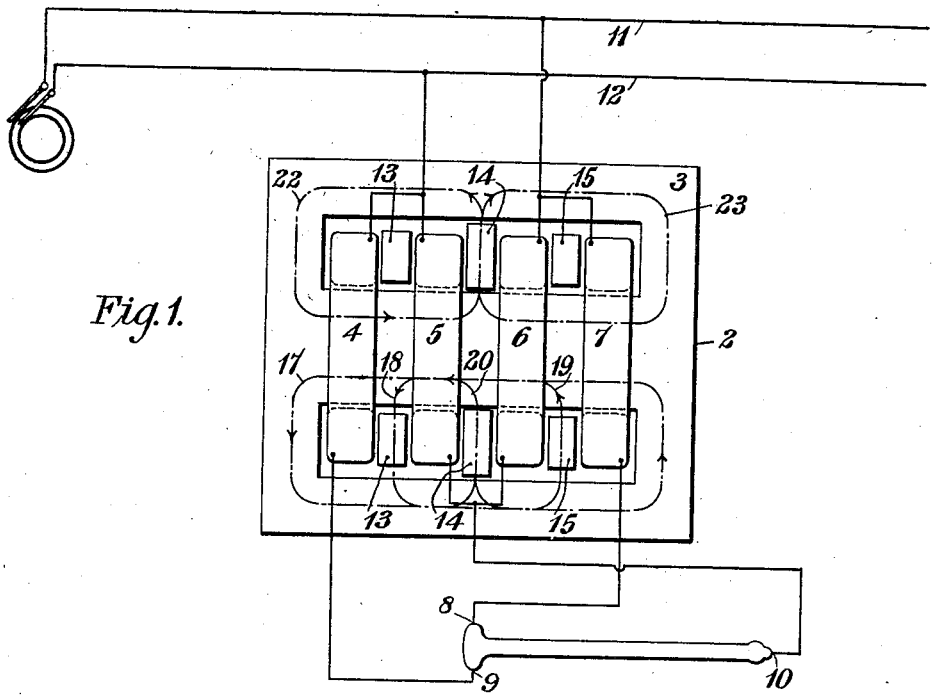
Figure 2:
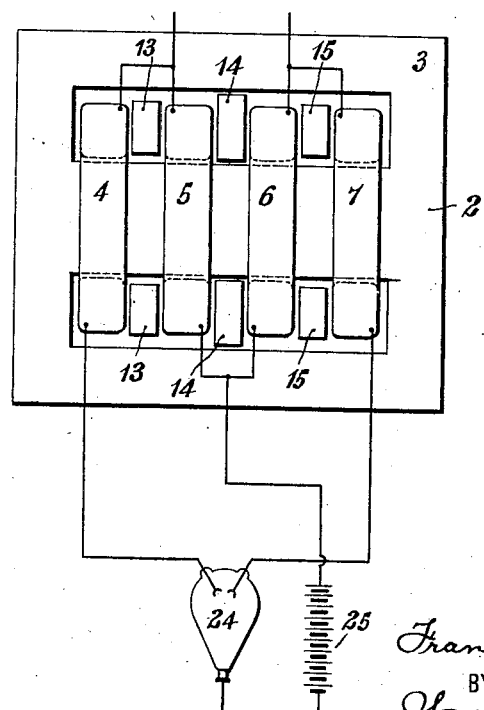

Figure 1 of the accompanying drawings is a diagrammatic view of a system embodying my invention, and in which rectified current is supplied to a gas or vapor lamp, and Fig. 2 is a diagrammatic view of a system adapted for charging storage batteries.

In Fig. 1, a mercury-vapor or other vapor or gas lamp 1 is supplied with current from an auto-transformer 2 comprising a magnetizable core 3 of the shell type and four series-connected spaced coils 4, 5, 6 and 7, positive terminals 8 and 9 of the lamp being connected to the extremities of the transformer winding, and negative terminal 10 thereof being connected to the neutral or other suitable intermediate point of the winding. The extremities of the coils 5 and 6 are connected to conductors 11 and 12 of an alternating current circuit, the said coils constituting the primary winding of the transformer, while all of the coils constitute the secondary winding.

Between each pair of adjacent coils are placed bundles of sheet iron 13, 14 and 15 for providing leakage paths of relatively low reluctance for magnetic flux between the inner and the outer legs of the transformer core. The bundles of iron 14 provide leakage paths of low reluctance for the secondary flux, and the bundles 13 and 15 provide paths for the primary flux. In the present instance, the sizes and disposition of the bundles of iron are such that the leakage paths for the secondary flux are of less reluctance than the paths for the primary flux, it being noted that the air-gaps between the bundles of iron 14 and the legs of the transformer core are less in width than the air-gaps between the bundles of iron 13 and 15 and the legs of the core. It will be understood, however, that the transformer here illustrated is adapted only for special circuit conditions and that other conditions may arise which would require or render desirable a modification of the structure.

The provision of a leakage path of relatively low reluctance for the primary flux obviates the necessity of employing a separate impedance device in the alternating current circuit, or of an ohmic resistance device in the connection between the terminal 10 of the lamp and the neutral point of the transformer winding, since sufficient impedance is thereby introduced into the circuit to cause the requisite or desired drop of potential when the circuits are traversed by current, and the provision of a leakage path of relatively low reluctance for the secondary circuit flux introduces inductance into the secondary circuit of the transformer whereby the current through the lamp is sustained.

The mode of operation of the invention will be more readily understood from a consideration of the directions of the several fluxes in the transformer core. The current in the primary coils 5 and 6 during a given instant produces a main flux in the direction of the line 17 and leakage fluxes through the bundles of iron 13 and 15, as indicated by the lines 18 and 19. A small amount of leakage flux also traverses the bundles of iron 14, as indicated by the lines 20. The leakage flux indicated by the lines 18 and 19 is that which introduces impedance into the primary circuit of the transformer. This flux does not tend to maintain the rectified current in the lamp 1, but simply shifts the phase of the alternating current with respect to the electromotive force, and it, therefore, has only the same effect as impedance placed between the transformer and the supply circuit.

The primary flux induces a current in one-half of the secondary coils (4 and 5) which causes a flux that is opposite in direction to the primary flux. It will be understood that the flux produced by the current traversing the coils 4 and 5 will be substantially double that produced by the primary coil 5, since the ampere turns in the active portion of the secondary winding are double those in each of the primary coils. The secondary flux is opposed, not only by that produced by the coil 5, but also by that produced by the primary coil 6 and, therefore, some of it is forced to traverse paths through the bundles of iron 14. The secondary leakage flux is indicated by line 22, it being noted that it surrounds the secondary coils 4 and 5. During the next half cycle of the alternating current, the direction of the primary flux will be reversed, while the coils 6 and 7 will constitute the active portion of the secondary winding. The flux produced by the coils 6 and 7 will oppose that produced by the primary coils 5 and 6 and a leakage flux will be caused to traverse a path indicated by the line 23. Since the leakage fluxes indicated by the lines 22 and 23 traverse the portions of the magnetic circuit between the coils 5 and 6 in the same direction, there is a lack of necessity of reversing the magnetism in, or of fully re-magnetizing, the bundles of iron 14 and the gaps between them and the legs of the core during each half cycle of the alternating current, with the result that the increase of current in each half of the secondary winding will be but slightly delayed. The decrease of current, however, in each half of the secondary winding is considerably delayed by the energy previously stored thereby in the corresponding portions of the magnetic circuit, and the uni-directional or rectified currents, therefore, that are derived from the respective halves of the secondary winding during successive half cycles of the alternating current, overlap. Thus, the leakage paths afforded by the bundles of iron 14 provide means for sustaining the direct or rectified current; i. e., for preventing it from falling below a definite or predetermined value. The leakage fluxes indicated by the lines 22 and 23 have no effect in causing a drop in electromotive force in the system, because the direction of the fluxes in the bundles of iron 14 does not change, and the effect of the said fluxes is, therefore, only to sustain the rectified current.

In Fig. 2, a current-rectifying device 24 is supplied from the transformer 2 and the rectifying device, in turn, supplies rectified current for charging a storage battery 25, the circuit connections being similar to those shown in Fig. 1. In employing mercury-vapor and similar rectifiers for charging storage batteries, it is quite desirable to provide means not only for sustaining and smoothing out the rectified current but also for causing a suitable drop of potential in the system in order that the amount of current supplied to the battery may be regulated in accordance with its voltage and the operation of the system thereby rendered uniform and stable. With the transformer constructed as herein set forth, a large amount of current is supplied to the battery when beginning the charging operation, because the voltage of the battery is low and a large current value is required to cause such a drop of potential in the system that the voltage applied to the battery may be substantially the same as that of the battery. As the battery becomes charged and its voltage rises, the requisite drop of potential in the system decreases and the amount of current supplied to the battery also decreases correspondingly. It is seen, therefore, that the present transformer permits of automatic regulation of the operation of the system.

I claim as my invention:

1. The combination with an alternating current circuit, and a current-rectifying device, of a transformer interposed between the circuit and the device comprising primary and secondary coils, and leakage paths of low reluctance between the coils whereby impedance is introduced into the primary circuit and inductance into the secondary circuit.

2. The combination with an alternating current circuit, and a current-rectifying device, of a transformer interposed between the circuit and the device comprising primary and secondary coils, and leakage paths for the primary and secondary fluxes, respectively, the leakage paths for the primary flux being of greater reluctance than the leakage paths for the secondary flux.

3. The combination with an alternating current circuit, and a current-rectifying device, of a transformer interposed between the circuit and the device comprising primary and secondary coils, and magnetizable material between adjacent coils providing leakage paths of low reluctance for the primary and secondary fluxes respectively.

4. The combination with an alternating current circuit, and a current-rectifying device, of a transformer interposed between the circuit and the device and embodying means for introducing inductance into both the primary and secondary circuits.

5. The combination with an alternating current circuit, and a current-rectifying device, of a transformer interposed between the circuit and the device and embodying means for sustaining the rectified current and for causing a drop in electromotive force that is dependent upon the amount of current taken by the device.

6. The combination with an alternating current circuit, and a current-rectifying device, of a storage battery supplied by the rectifying device, and a transformer interposed between the circuit and the device and embodying means for sustaining the rectified current and for causing the electromotive force applied to the battery to increase automatically as the battery becomes charged.

7. The combination with an alternating current circuit, and a current-rectifying device, of a storage battery supplied by the rectifying device, and a transformer interposed between the circuit and the device and embodying means for sustaining the rectified current and for causing the current supplied to the battery to decrease automatically in amount as the battery becomes charged.

8. The combination with an alternating current circuit, and a current-rectifying device, of a storage battery supplied by the rectifying device, and a transformer interposed between the circuit and the device and embodying means for sustaining the rectified current, and for regulating the rate of charging of the battery.

9. A transformer comprising a magnetizable core, series-connected coils thereon, a plurality of which are included in each of the primary and secondary circuits, and means providing leakage paths for relatively low reluctance between all adjacent coils.

10. A transformer comprising a magnetizable core, a plurality of series-connected coils arranged side by side upon the core, the outer coils constituting part of the secondary circuit, and means providing leakage paths of relatively low reluctance between all adjacent coils.

11. The combination with an alternating current circuit, and a current-rectifying device, of a transformer interposed between the circuit and the rectifying device comprising a plurality of coils arranged to form two secondary circuits that are traversed respectively by currents of uniform direction, and a magnetizable core for the coils adapted to provide a leakage path for fluxes between the coils pertaining respectively to the two secondary circuits.

12. The combination with an alternating current circuit, and a current-rectifying device, of a transformer interposed between the circuit and the rectifying device comprising a plurality of coils arranged to form two secondary circuits that are traversed respectively by currents of uniform direction, and a magnetizable core for the coils adapted to provide leakage paths for fluxes surrounding the coils pertaining respectively to the two secondary circuits, the said paths having a common portion in which the leakage fluxes are of uniform direction.

13. The combination with an alternating current circuit, and a current-rectifying device, of a transformer interposed between the alternating current circuit and the rectifying device and embodying means for sustaining the rectified current.

14. The combination with an alternating current circuit, a current-rectifying device, and a circuit supplied therefrom, of a transformer interposed between the circuit and the rectifying device and embodying means for introducing inductance into the circuit supplied therefrom.

15. The combination with an alternating current circuit, and a current-rectifying device, of a transformer interposed between the circuit and the rectifying device comprising a plurality of coils arranged to form two secondary circuits that are traversed respectively by currents of uniform direction, and means providing a low reluctance leakage path between the coils pertaining respectively to the two secondary circuits.

16. The combination with an alternating current circuit, and a current-rectifying device, of a transformer interposed between the circuit and the rectifying device and provided with leakage paths for fluxes between the secondary coils and between the primary and secondary coils thereof.

17. A transformer comprising a plurality of secondary coils and low reluctance leakage paths between the said coils.

18. A transformer comprising one or more primary coils, a plurality of secondary coils, and low reluctance leakage paths between the secondary coils and between the primary and secondary coils.

19. The combination with an alternating current circuit, and a current rectifying device, of a transformer interposed between the circuit and the device comprising primary and secondary coils, and leakage paths of unequal reluctance for the primary and secondary fluxes.

20. A transformer comprising primary and secondary coils and leakage paths of unequal reluctance for the primary and secondary fluxes.

In testimony whereof, I have hereunto subscribed my name this 31st day of Dec., 1907.

FRANK CONRAD.

Witnesses:
OTTO S. SCHAIRER,
BIRNEY HINES.